(12) United States Patent
Murgu et al.

(10) Patent No.: US 6,289,852 B1
(45) Date of Patent: Sep. 18, 2001

(54) HOT WATER AND STEAM GENERATING METHOD AND APPARATUS

(75) Inventors: Cristian Murgu, Coquitlam; Edgar C. Robinson, Vancouver; Leonard William Fleming, Maple Ridge, all of (CA)

(73) Assignee: International Thermal Investments Ltd., Richmond (CA)

( * ) Notice: Subject to any disclaimer, the term of this patent is extended or adjusted under 35 U.S.C. 154(b) by 0 days.

(21) Appl. No.: 09/657,773

(22) Filed: Sep. 8, 2000

(51) Int. Cl.$^7$ ....................................................... F22C 5/04
(52) U.S. Cl. ...................... 122/448.1; 122/31.2; 122/14.3
(58) Field of Search ..................... 122/31.2, 31.1, 122/126, 130, 14.3, 90, 118, 119, 28, 448.1

(56) References Cited

U.S. PATENT DOCUMENTS

| | | | |
|---|---|---|---|
| 4,308,855 | * 1/1982 | Schallert | 126/360 |
| 4,530,347 | * 7/1985 | Baker et al. | 122/31.1 |
| 5,086,731 | * 2/1992 | Lockett et al. | 122/31.2 |
| 5,197,415 | * 3/1993 | Stretch et al. | 122/14.3 |
| 5,224,445 | * 7/1993 | Gilbert, Sr. | 122/448.1 |

* cited by examiner

Primary Examiner—Gregory Wilson
(74) Attorney, Agent, or Firm—John Russel Uren (57) ABSTRACT

Method and apparatus for heating water to one of a plurality of predetermined temperatures and for generating steam. A burner with a water jacket receives water from a pump which obtains water from a water source flowing through one of plurality of different flow circuits. The burner provides heat for heating the water to one of the predetermined temperatures as selected by an operator. The water flow through the burner is regulated by a temperature sensor which senses the temperature of the water within the water jacket. The water flow changes if the temperature sensor senses a temperature which is higher or lower than the predetermined value. Steam may further be generated though a further steam flow circuit to maintain water temperatures with the containers or to heat the water within the containers to desired temperatures.

23 Claims, 14 Drawing Sheets

HOT WATER AND STEAM GENERATING METHOD AND APPARATUS

INTRODUCTION

This invention relates to a hot water and steam generator and, more particularly, to a hot water and steam generator which may be used to heat water to a plurality of desired temperatures and, in addition, to produce steam for the same purpose.

BACKGROUND OF THE INVENTION

In kitchen duty applications, particularly kitchen duty applications where a large number of individuals may eat, the dishes and other utensils are typically washed in several containers, each container holding water at a different and predetermined temperature. The dishes and utensils are typically first washed in water at a lower temperature. Thereafter, they are transferred to a container holding water at a higher temperature for rinsing. The highest temperature water is used for sterilising the dishes and the water is generally maintained at 180 deg. F. The water in the other containers is generally maintained at 130 deg. F. and 150 deg. F., respectively.

Heretofore, each water container generally used its own burner for producing heated water and for maintaining the water in the container at the desired temperature. This was inefficient and unnecessarily costly. In using steam for heating the water, manual operation was provided which, likewise, is an inefficient use of personnel.

SUMMARY OF THE INVENTION

According to the invention, there is provided apparatus for heating water to a predetermined temperature, said apparatus comprising a burner, a water jacket surrounding said burner for heating said water to said predetermined temperature, a water source to supply water to said water jacket surrounding said burner, a water outlet from said water jacket and said burner for carrying said water following said heating of said water by said burner to said predetermined temperature, a pump to move said water from said water source to said water jacket, a water temperature sensor operably connected to said water jacket for sensing said predetermined temperature of said water and a first water volume control for regulating the volume of said water provided to said water jacket of said burner from said water source, said first water volume control being responsive to said water temperature sensor.

According to a further aspect of the invention, there is provided a method of heating water to a predetermined temperature comprising supplying water from a water source through a first water volume control to a water jacket surrounding a burner, heating said water in said water jacket to said predetermined temperature, sensing when said predetermined temperature is reached and regulating said first water volume control to control the volume of water flowing to said burner responsive to said temperature sensing.

According to yet a further aspect of the invention, there is provided apparatus for generating heated water comprising a source of water, a first circuit for conveying water to a burner, a first volume control for regulating the amount of said water conveyed to said burner through said first circuit, a second circuit for conveying water to said burner, a second volume control for regulating the amount of said water conveyed to said burner through said second circuit, an outlet from said burner for said water, and a temperature sensor for sensing the temperature of said water passing from said outlet.

According to still yet a further aspect of the invention, there is provided a method of providing water at more than one predetermined temperature to a water jacket surrounding a burner, said method comprising the steps of selecting one of said predetermined temperatures for said water, passing water through said water jacket to heat said water to said predetermined temperature and regulating the volume of said water provided to said burner so as to maintain said water at said one of said predetermined temperatures.

According to yet a further aspect of the invention, there is provided apparatus for generating steam for heating the temperature of a liquid to a predetermined value, said apparatus comprising a water source, a steam control circuit associated with said water source, a pump associated with said steam control circuit for supplying water to a water jacket of a burner and a steam water level sensor for sensing the level of water in said water jacket.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

Figure 1A:
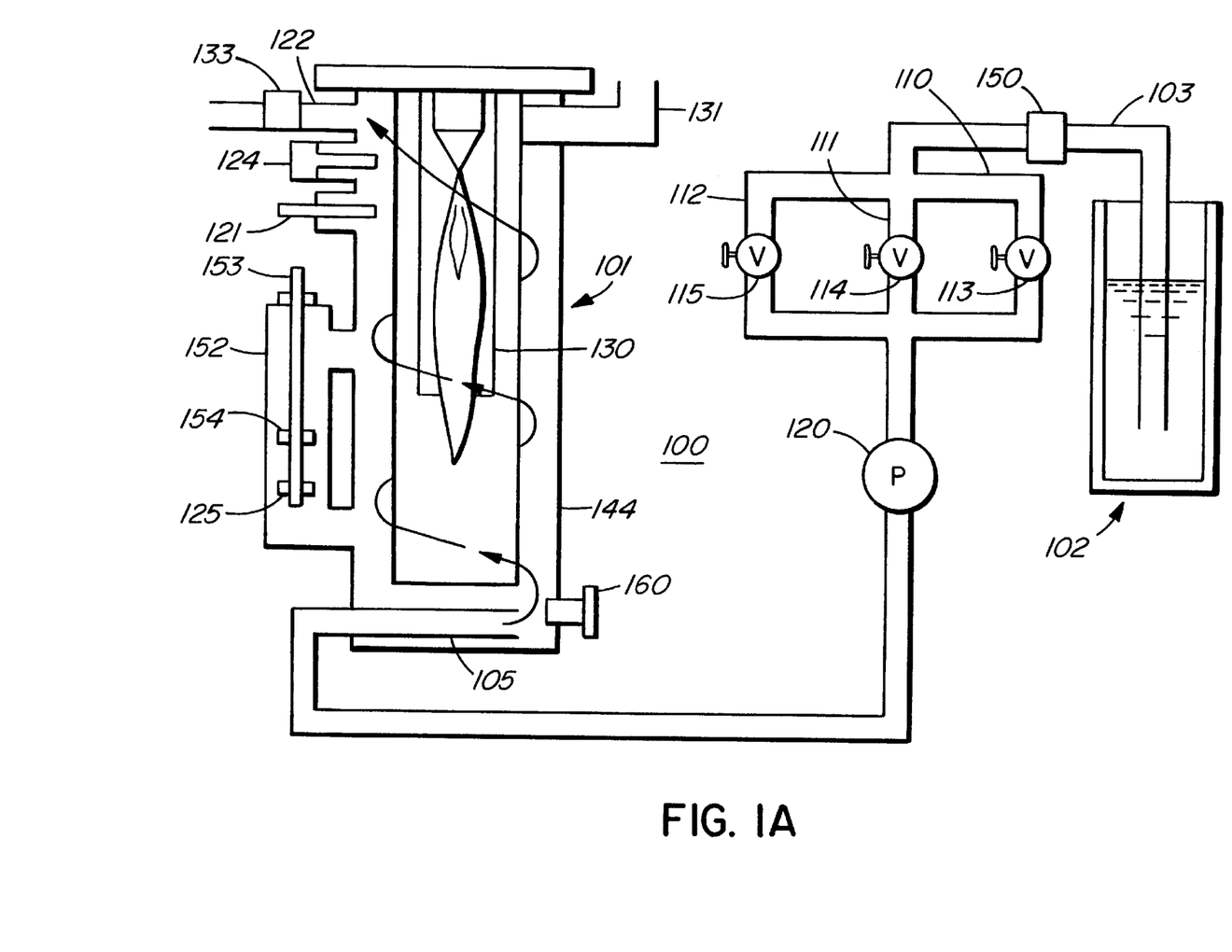
FIG. 1A is an overall flow diagram illustrating the several components of the water heater and steam generator according to the invention.
Figure 1B:
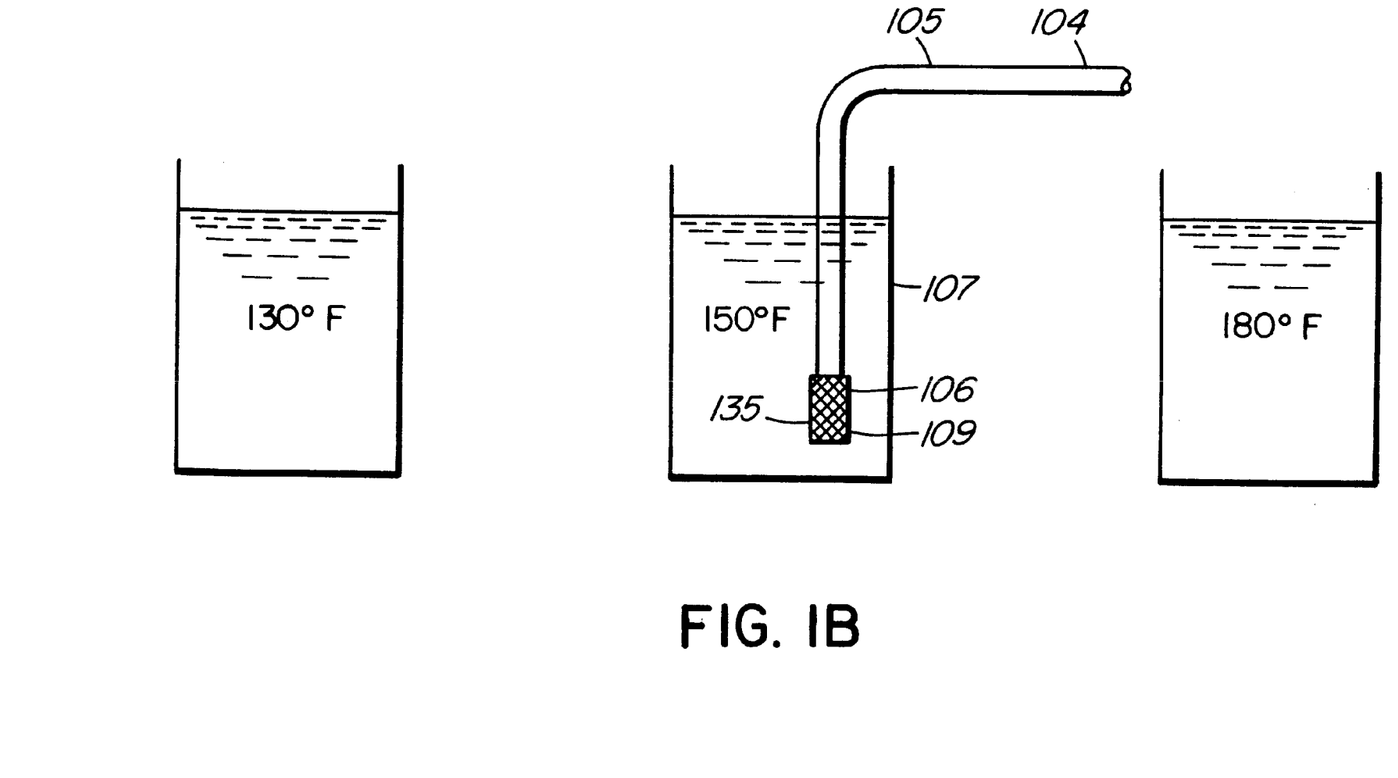
FIG. 1B is a diagrammatic illustration of the several water holding containers and the hose which is connected to the outlet passageway from the water jacket of the burner system of FIG. 1A.

Referring now to the drawings, a water heater and steam generator system is generally illustrated at 100 in FIG. 1. The water heater and steam generating system 100 comprises a burner system generally illustrated at 101 which includes a diesel fuel burner 130 although a plurality of fuels may be conveniently used, a water jacket 144, a source of water generally illustrated at 102, an inlet water line 103 from the water source 102 and an outlet water line 104 which leaves the burner system 101. The outlet water line 104 is connected to a hose 105 (FIG. 1B) with an attached steam dispenser or "sparger" 106 as will be described. The inlet pipe 105 within water jacket 144 provides water which exits close to the wall of the water jacket 144. This exit flow will circulate as indicated around the burner 130 within the water jacket 144 and exits into the water outlet 104. The circulation is intended to prevent water layer stratifications in the burner system 101.

There are three circuits provided for the water coming from the water source 102. The first or steam circuit 110 is used when steam only is being generated. The second or high flow circuit 111 is the high volume water circuit where maximum water flow to the water jacket 144 of the burner 101 takes place. The third or low flow circuit 112 is the low volume water circuit where low volume water flow takes place. The different volumes of flow through the first, second and third circuits 110, 111, 112 will be explained in greater detail.

Each of the three circuits 110, 111, 112 has a solenoid valve shown at 113, 114, 115, respectively. The solenoid valves 113, 114, 115 may each be opened or closed to allow or to stop fluid flow as will be described.

A pump 120 is used to provide fluid flow between the water source 102 and the burner system 101. A temperature sensor 121 is provided below the water outlet passageway 122. If the temperature sensor 121 senses a temperature exceeding a selected value, the burner system 101 will shut down for safety purposes. A pressure sensor 123 is located in the water outlet passageway to sense the pressure in the outlet passageway 122. High and low lever water sensors 124, 125, respectively, are provided to sense the water level within the burner system 101. The combustion flame shown diagrammatically at 130 provides exhaust products which pass to the atmosphere through exhaust stack 131.

Figure 2:
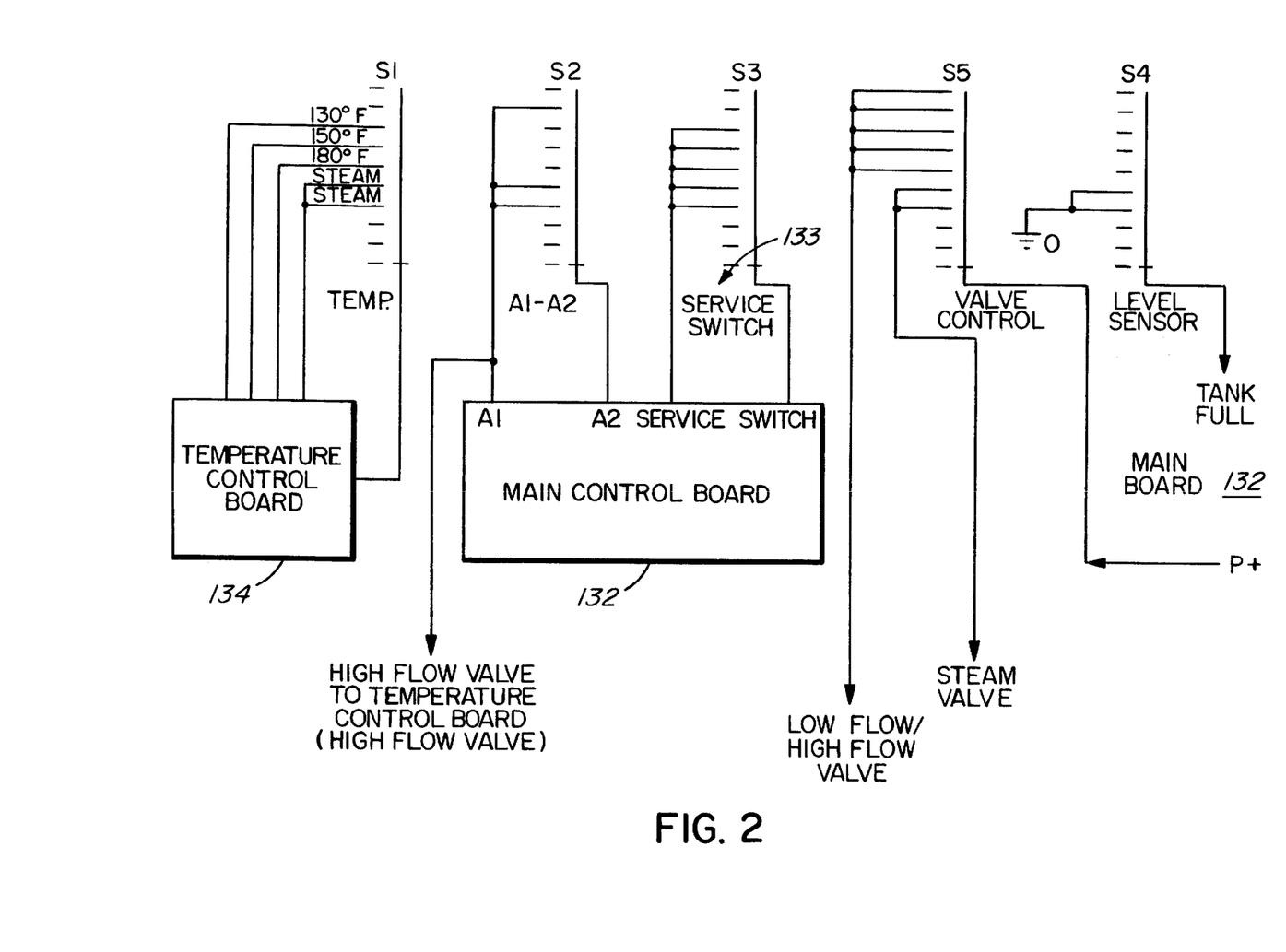
FIG. 2 diagrammatically illustrates the main control and temperature control boards used with the water heater and steam generator of FIG. 1.
Figure 3:
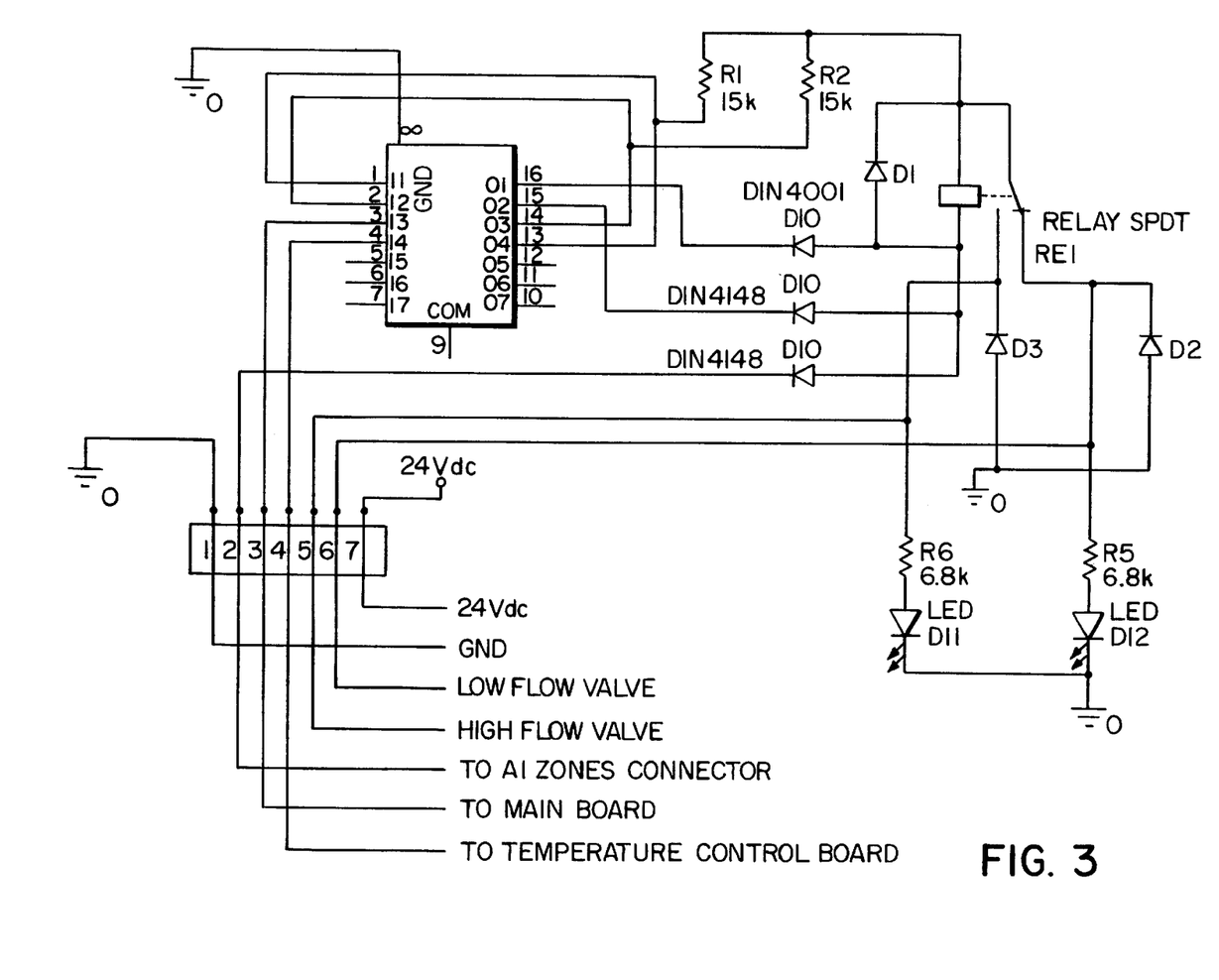
FIG. 3 diagrammatically illustrates the flow control circuitry used with the water heater and steam generator of FIG. 1.

There are a plurality of control boards provided to monitor system temperature and pressure conditions and to reconfigure the heating and steam generating system 100 when conditions are changed either manually by human input or automatically during system operation. The main board generally shown at 132 (FIG. 2) receives input from each of the sensors and the satellite circuits associated with the sensors. The main board 132 also receives input from the service switch 133 which, by way of manual operator intervention, selects the desired and predetermined temperature for the water exiting from burner 101 or, alternatively, receives input from the operator if the steam generating condition is required.

Figure 4:
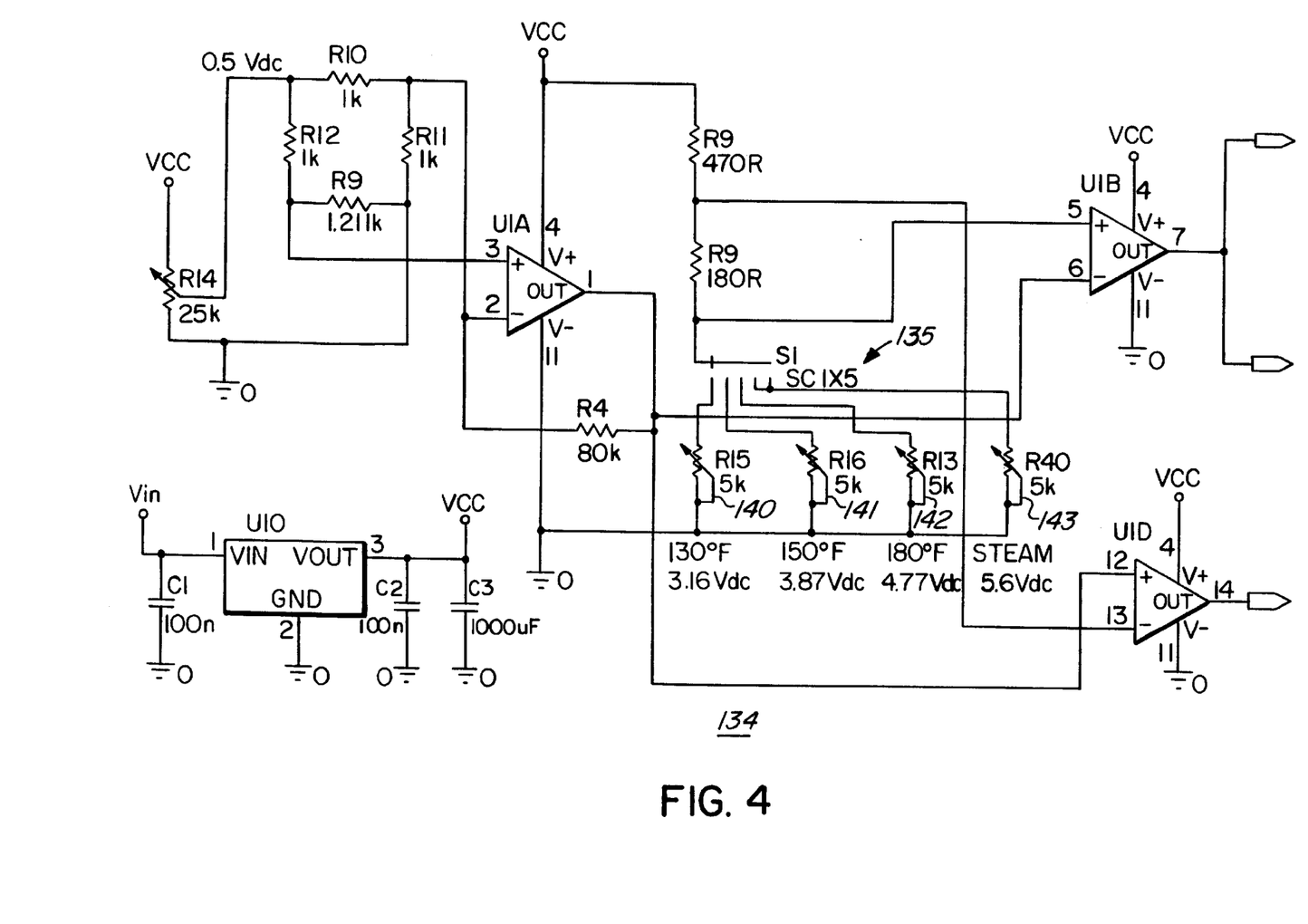
FIG. 4 is a schematic illustrating the temperature control circuitry used with the water heater and steam generator of FIG. 1.
Figure 5:
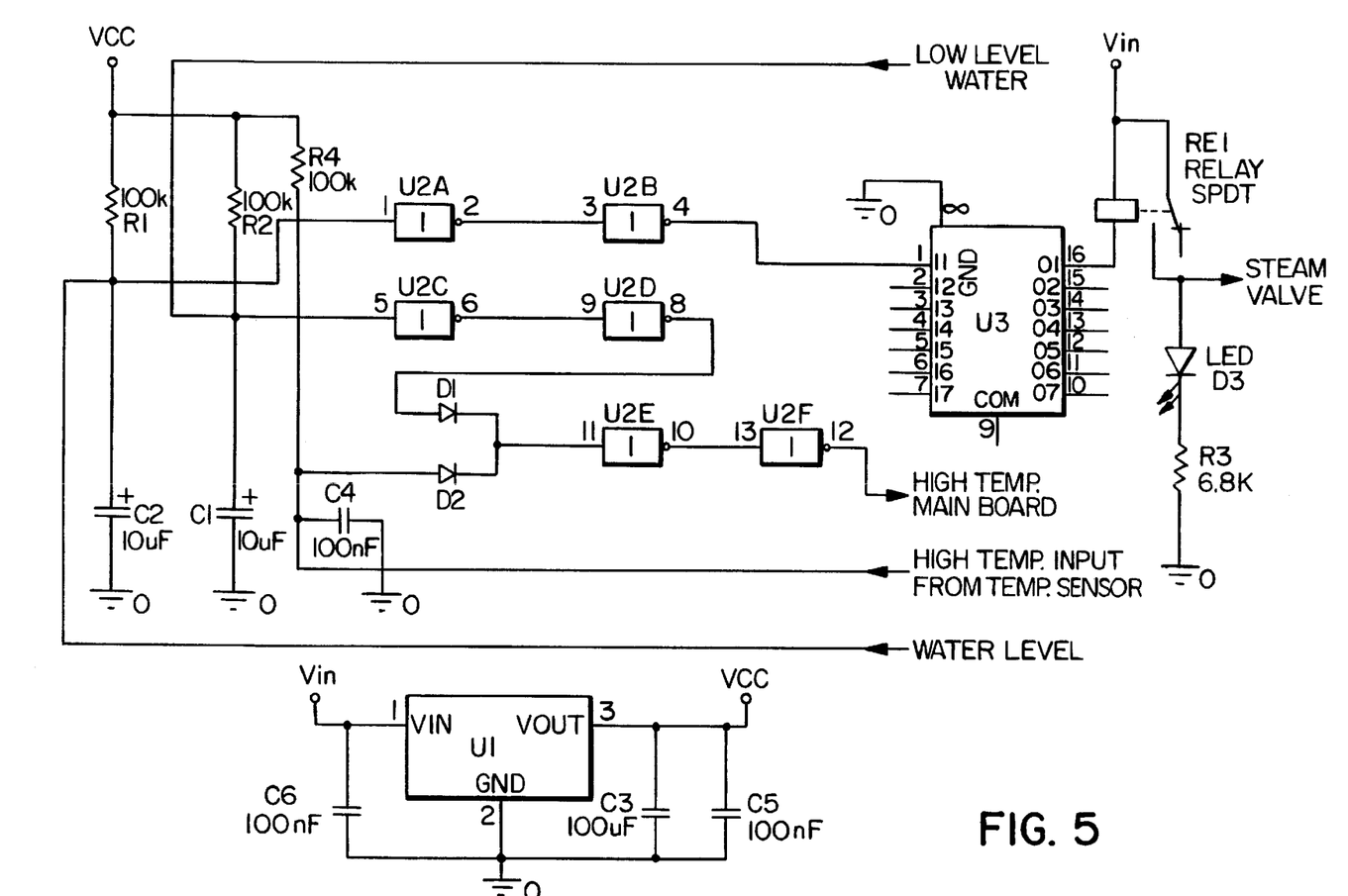
FIG. 5 is a schematic illustrating the water level and low limit control circuitry used with the water heater and steam generator of FIG. 1.
Figure 6A:
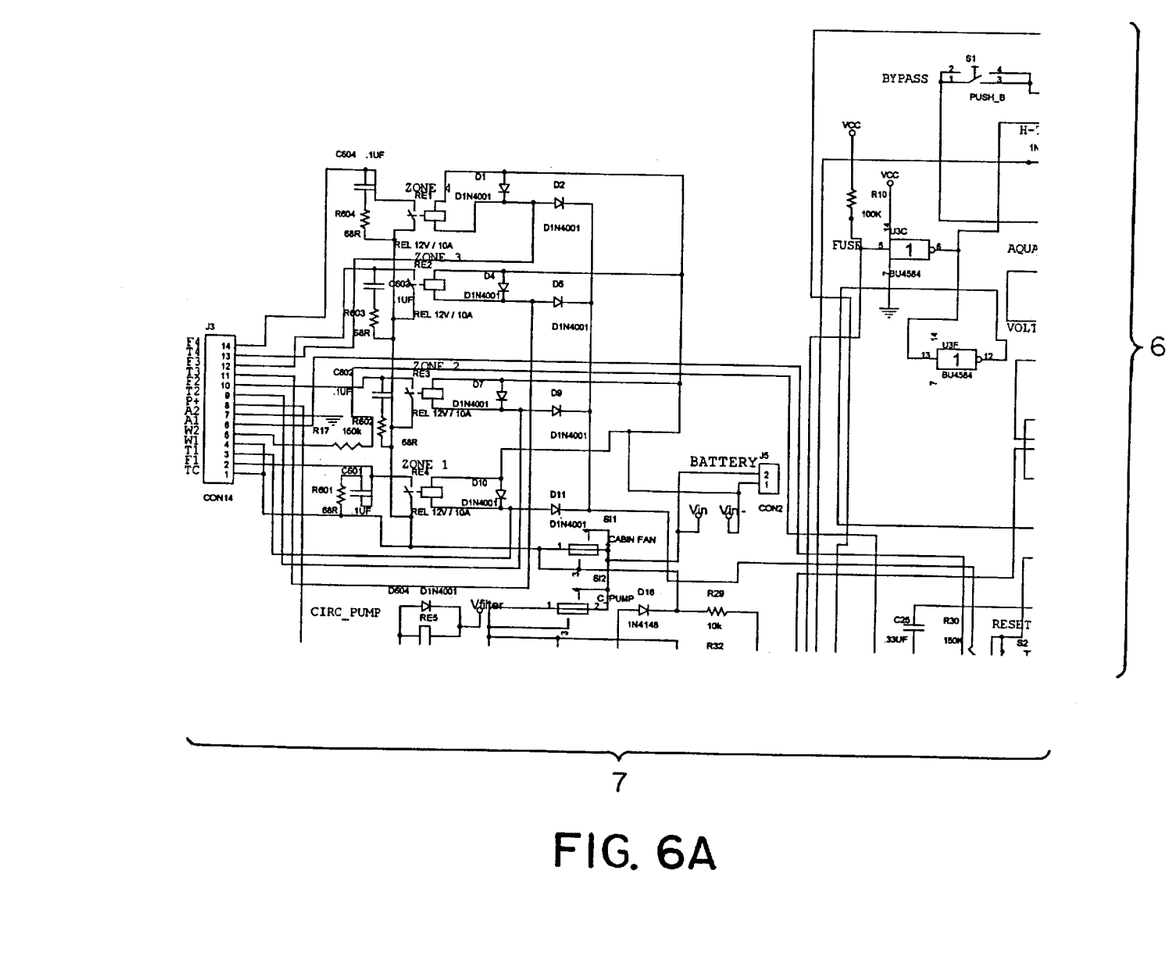
FIGS. 6A–6G comprise a single schematic drawing of the main control board presented on seven (7) sheets with like numbers indicating where the drawings join.
Figure 6B:
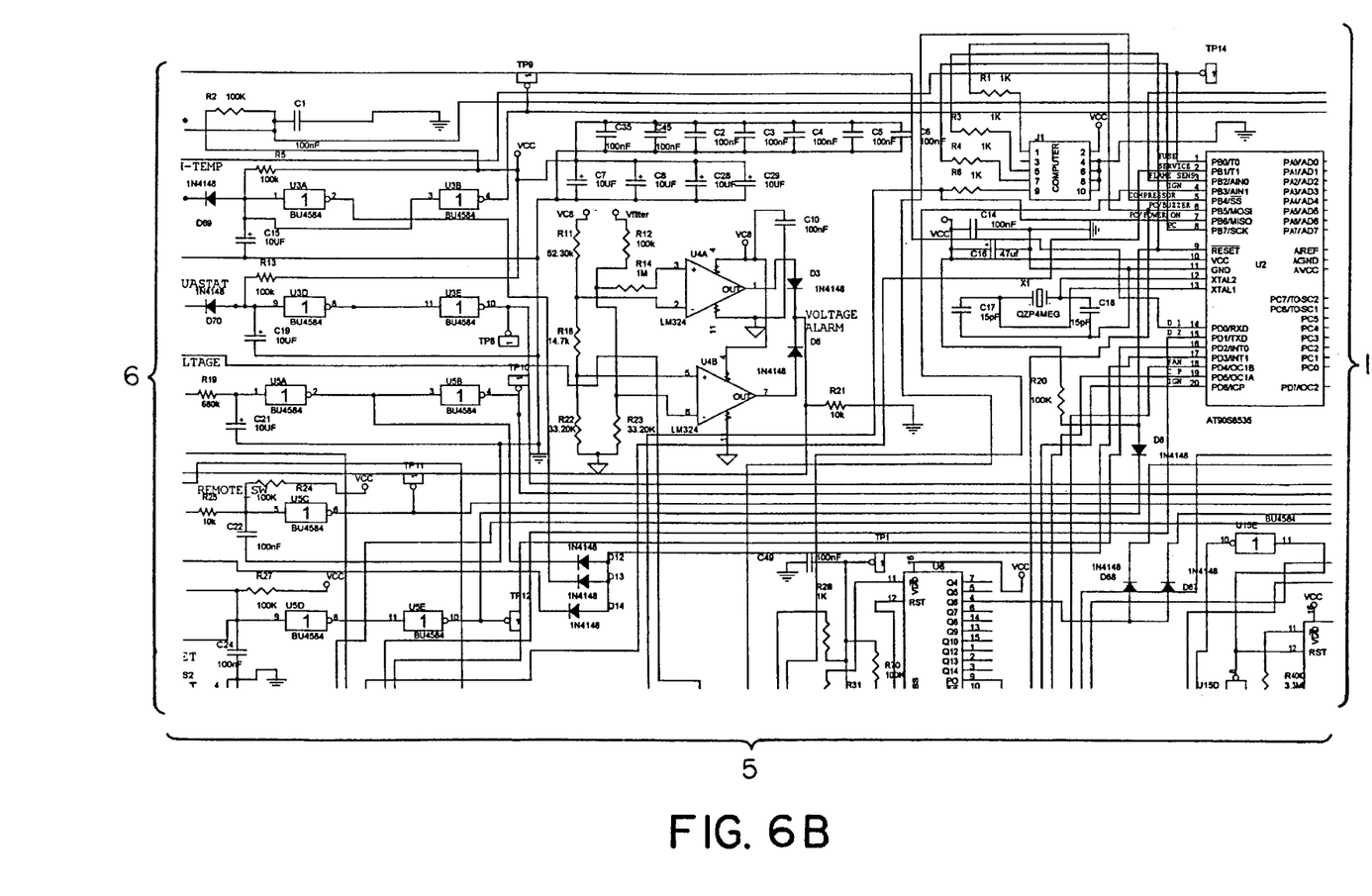
Figure 6C:
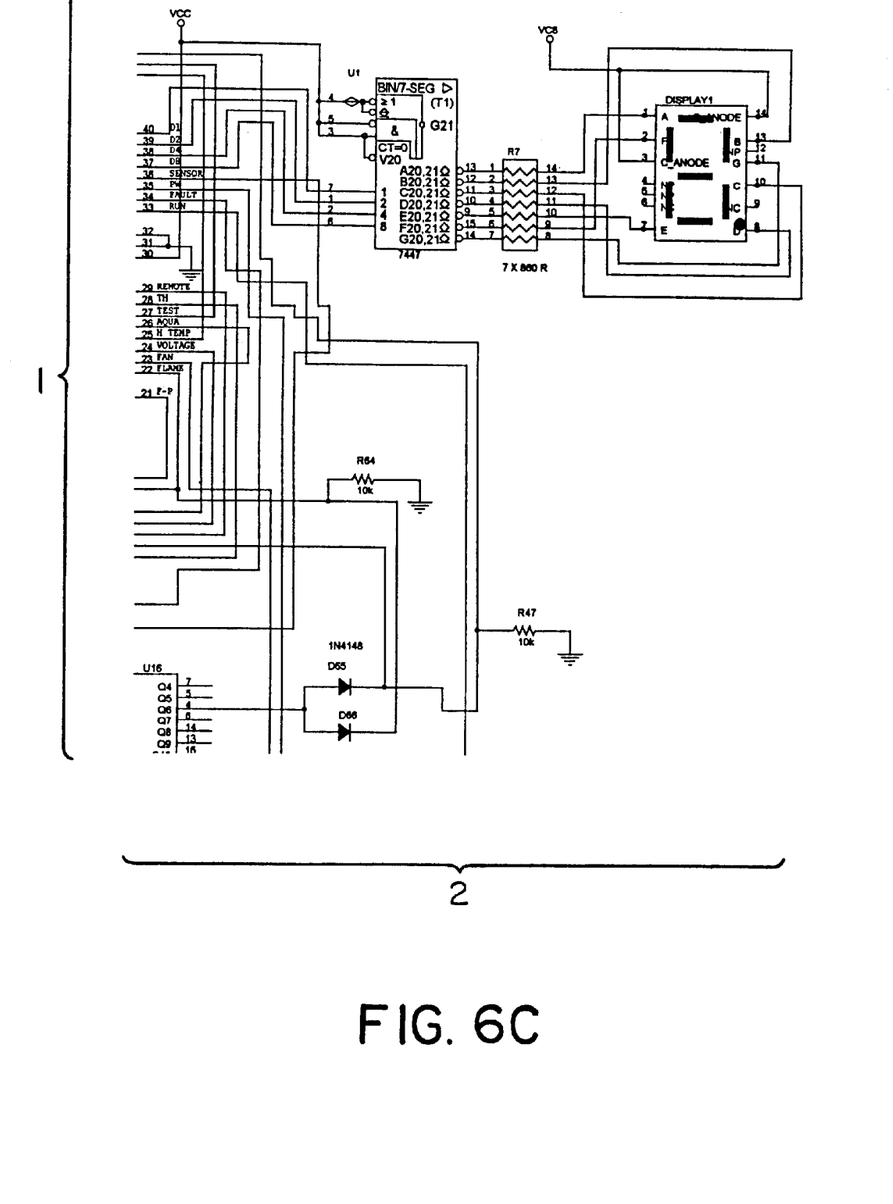
Figure 6D:
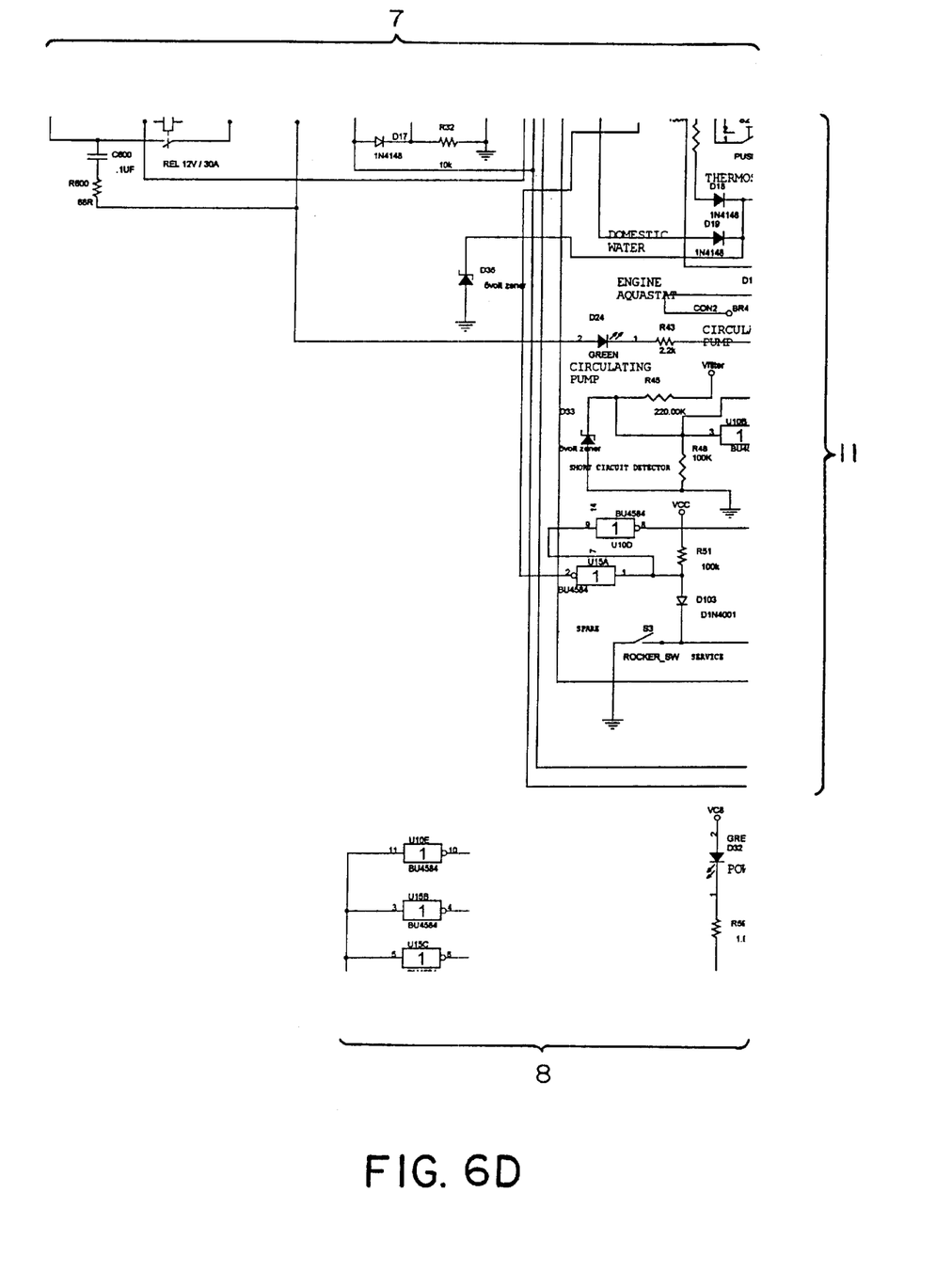
Figure 6E:
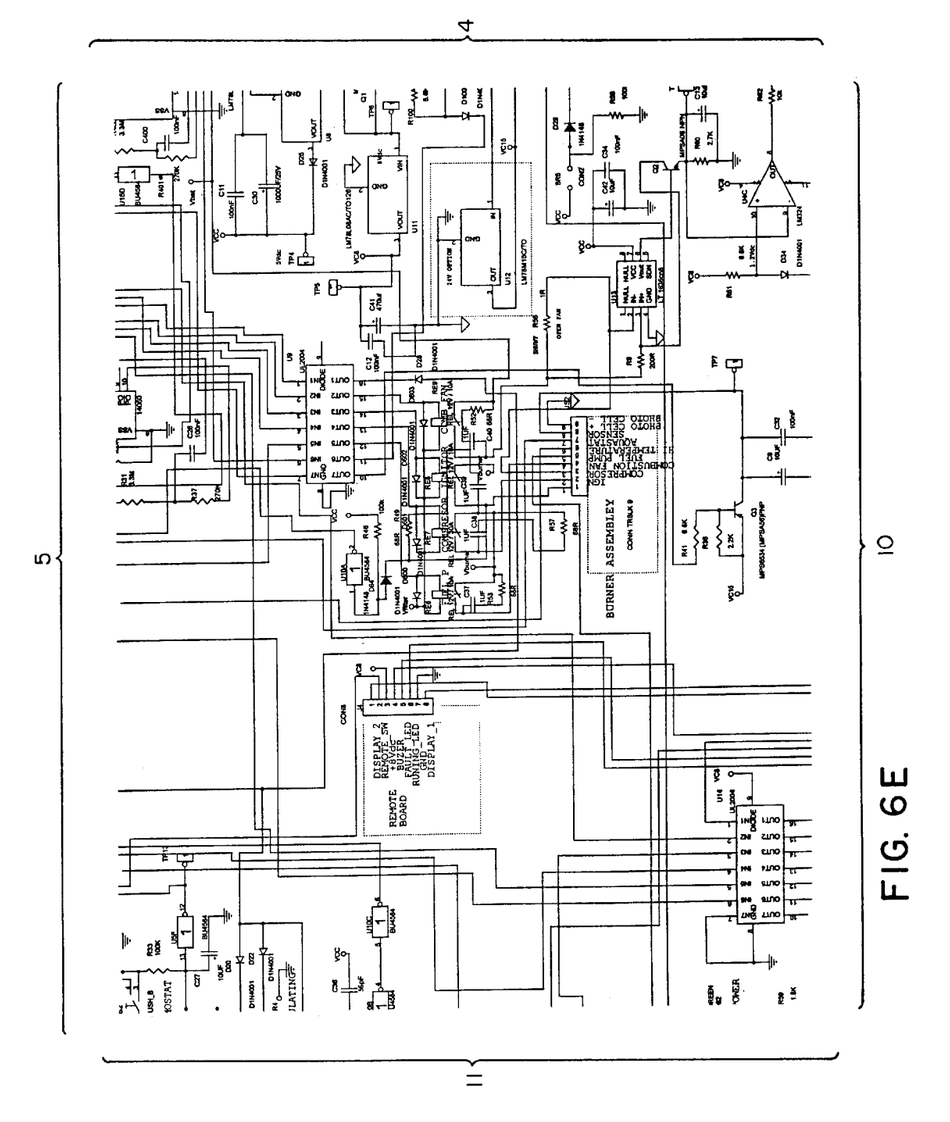
Figure 6F:
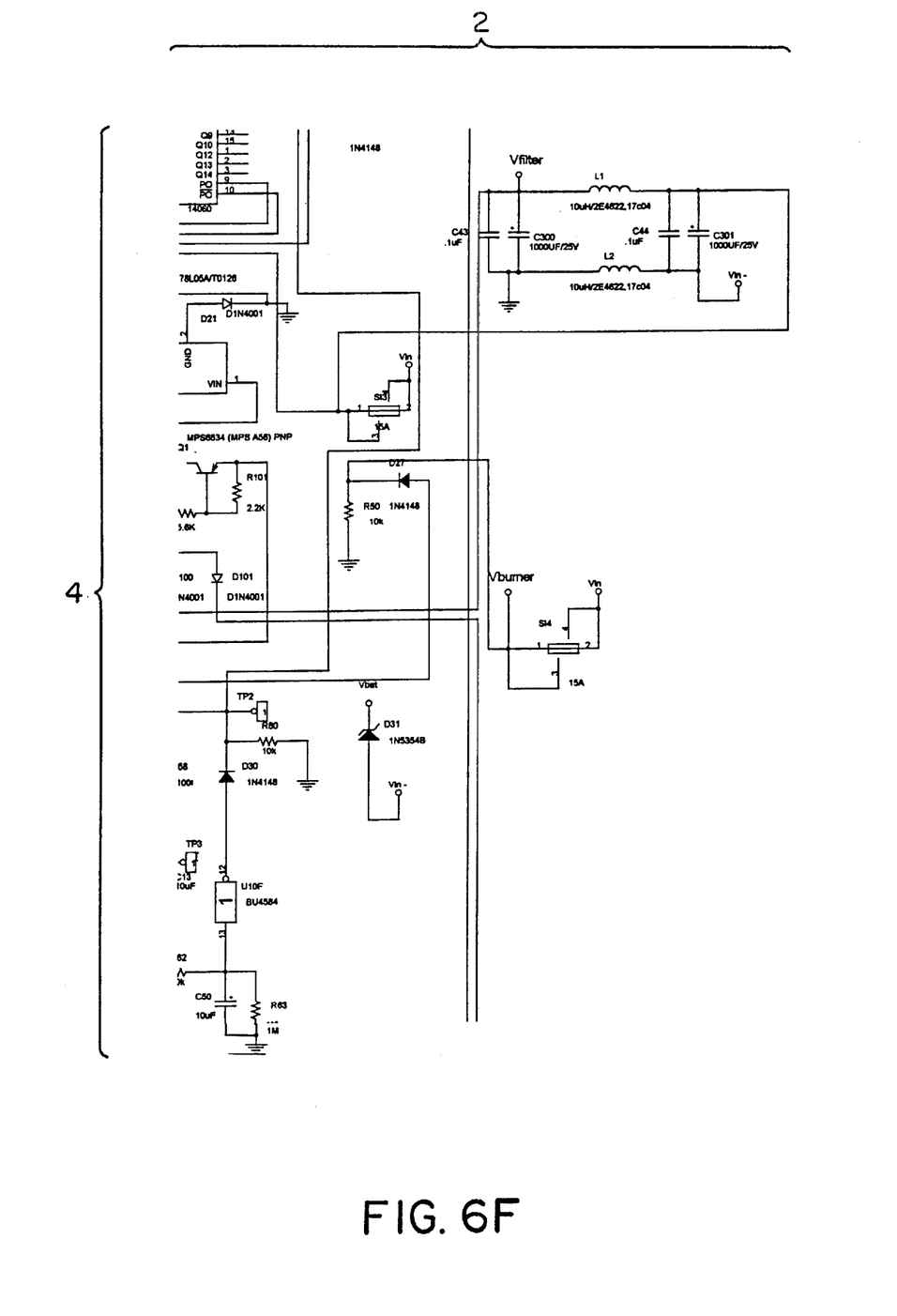
Figure 6G:
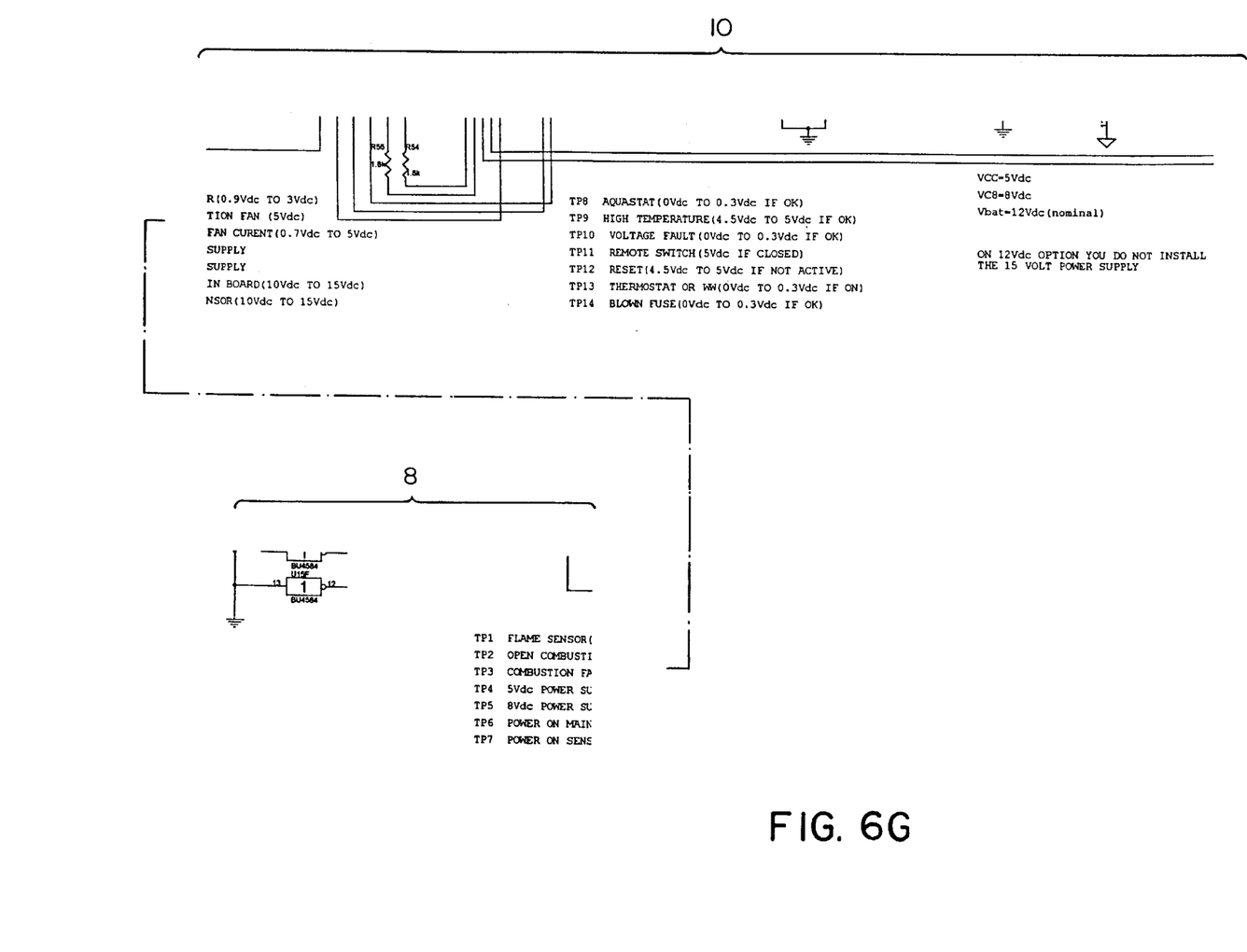

The temperature control board is generally shown at 134 and in detail in FIG. 4. The temperature control board 134 utilises the service switch 133 which selects one of three temperatures, conveniently 130 deg. F. shown as 140, 150 deg. F. shown as 141, 180 deg. F. shown as 142 or, alternatively, the steam only condition shown at 143.

A pressure relief valve 160 is used for safety purposes. If the pressure builds up within the water jacket to a figure considered safety related, the pressure relief valve 160 will open allowing excess pressure to escape.

OPERATION

In operation, the water outlet passageway 104 is typically attached to one or a plurality of hoses 105 (FIG. 1B). A sparger or steam dissipation cylinder 106 is connected to one end of the hose 105 and is used to generally dissipate the heat within the water when the sparger 106 is generating steam. The sparger 106 is also used for water exiting from hose 105 when steam is not being generated. The sparger 106 is positioned within the container 107 holding water for purposes of maintaining the temperature of the water within the container 107 or, if steam generating only is used, to either maintain the temperature of the water in the container 107 or to increase the temperature of the water in the container 107 to a predetermined value as selected by service switch 133. A temperature sensor 135 may conveniently be used to shut off the sparger 106 when a desired temperature of water within the container 107 is reached.

The operator will select the desired temperature condition for water exiting from the water outlet passageway 122 utilising service switch 133. He does so by selecting a switch position, for example and conveniently, position 140 (FIG. 4), in order to obtain water at 130 deg. F. flowing through the outlet passageway 122 from burner 101.

The high flow valve 114 will open allowing water to flow from the water source 102 through pump 120 and into the water jacket 144. The water will continue to flow until the high water level sensor 124 senses the level whereupon the valve 114 will close thereby terminating flow.

If the water present in the tank or water jacket 144 surrounding the burner 130 is below 130 deg. F., the valves 113, 114, 115 will all be closed and pump 120 will terminate operation. The burner 101 will commence and continue operation until the water within the water jacket 144 reaches the desired temperature of 130 deg. F. as provided by temperature sensor 121. When the desired 130 deg. F. temperature is reached, high flow valve 114 will open, the pump 120 will commence operation and water will flow from the water source 102 through water filter 150 and pump 120 to the water jacket 144 surrounding burner 130. The pressure of the water caused by the operation of the pump 120 will cause flow through the water outlet passageway 122 and the hose 105 (FIG. 1B) which will be inserted into the container 107 where the water at 130 deg. F. will fill the container 107.

The water will continue to flow through the high flow circuit 111 and valve 114 until the temperature sensor 121 senses that the temperature has fallen below 130 deg. F. At this point, the high flow valve 114 will close and low flow valve 115 will open. Since steam valve 113 is closed, water will then flow through the low flow circuit 112. This will reduce the flow and allow the temperature of the water to increase thereby closely maintaining the desired 130 deg. F. temperature of the outlet water. If the temperature exceeds 130 deg. F., the low flow valve 115 will close and the high flow valve 114 will open. Thus, the temperature is continuously maintained very close to 130 deg. F.

The operator may then select a higher temperature for the water used to fill a further one of the containers 107. In this event, the valves 113, 114, 115 will again close, pumping action will stop and water will cease to flow until the temperature of the water in the water jacket 144 reaches the desired 150 deg. F. At this point, the pump 120 will commence operation, high flow valve 114 will open and water from water source 102 will flow through the high flow circuit 111 and valve 114 as before until the temperature sensor 121 senses the temperature falling below 150 deg. F. when the low flow valve 115 will open and the high flow valve 114 will close. Again, when the temperature exceeds the desired 150 deg. F., the low flow valve 115 will close and the high flow valve 114 will open. Thus, it will be seen that the desired temperature of the water is maintained by alternating flow through the high and low flow circuits 111, 112 as described. This continuous flow of water alternatively provided through the high and low flow circuits 111, 112 is an attractive feature since better mixing in the container 107 is provided.

If it is desired to lower the temperature of the water from, say, 150 deg. F. to 130 deg. F., the temperature sensor selector 133 is rotated to the 130 deg. F. position. Since the temperature of the water is then higher than desired, the high flow valve 114 will open and flow will continue until the desired 130 deg. F. temperature is reached. While removing the existing hot water above 130 deg. F., a sound warning may conveniently be given and a display will inform the operator that the water leaving is above the desired temperature. When the temperature falls below 130 deg. F., the high flow valve 114 will close and water will then flow through the low flow valve 115 and low flow circuit 112 until the desired temperature is again reached and the process continues as earlier described.

If the steam only position on the temperature sensor switch 133 is selected, the steam valve 113 will remain closed (as well as the low and high flow circuit valves 114, 115) and the burner 101 will continue operation until the water level within the water jacket 144 drops to the water line as sensed by water line sensor 154 (FIG. 1A). Water line sensor 154 has a roughly one-half inch (½") tolerance; that is, if the water level drops ½" below the desired water line, the steam valve 113 will open and allow water to flow from the water source 102 into the water jacket 144 until the water level rises ½" above the desired water line. Thus, the steam valve 113 will open and close to maintain the water level within the one-half inch tolerance of water level sensor 154. The steam only circuit 110 has the lowest flow of the three circuits 110, 111, 112 to maintain continuous steam generation. By keeping the water within the close limits of sensor 154, steam is generated which may be used to heat the water in the container 107 to a desired value or to maintain the temperature at a desired value. A sensor 109 (FIG. 1B) may be provided to sense the temperature of the water and switch off the steam supply hose when the desired temperature is reached.

A low level water sensor 125 is provided. If, for example, the water source 102 runs out of water, the low level water level sensor 125 will sense the water deficiency. The burner 101 will then shut down. An aural waring and a display of high temperature conditions can also be provided.

A pressure sensor 123 acts as a safety backup device. When the container is filled with water at the desired temperature, the hose may be shut down by the user. This will create a back pressure in the hose and in the outlet passageway 122. If the pressure exceeds a predetermined value, the burner system 101 will shut down. This will prevent damage and undue pressure within the water jacket 144 and the other operating components of the system.

It will be appreciated that the water flow obtained with the predetermined lower temperatures of 130 deg. F. will be higher than the water flow with higher temperatures of 150 deg. F. and 180 deg. This is so because it takes less time for the water being pumped through pump 120 to reach the desired temperatures; that is, as the desired temperature increases, the water flow will necessarily decrease to allow the burner 101 more time to heat the water to higher temperatures.

A secondary water tank 152 is also provided adjacent the water jacket 144 of the burner 130. The secondary water tank 152 is provided to monitor the level of water within the water jacket 144. A first level sensor 154 is provided and has been described. Likewise, the low level sensor 125 has also been explained.

A high water sensor 124 is provided. If the level of water exceeds the high level, as sensed by sensor 124, the pump 120 will terminate operation and the solenoid valves 113, 114, 115 will close until the water level falls within the desired limits. When the water falls within the desired limits, the burner 130 will again commence operation and the desired quantity of water will flow through either the high flow or low flow circuits 112, 111, respectively.

Many modifications will readily occur to those skilled in the art to which the invention relates. For example, rather than the use of a high flow and a low flow circuit, it would be possible to use a single circuit with a differential valve covering the flow limits rather than the two solenoid valves. However, differential valves are expensive and the use of two solenoids is preferred for costing purposes. Likewise, a DC pump 120 could be used for the same purpose; that is, a pump 120 to cover the desired water flow limits might be used with a step down DC/DC converter or PWM pulse with modulator provided for reducing the output of the pump 120 if low flow is desired. Nevertheless, the use of two relatively inexpensive type solenoid is preferred which produces the necessarily flexibility for operations.

Figure 7:
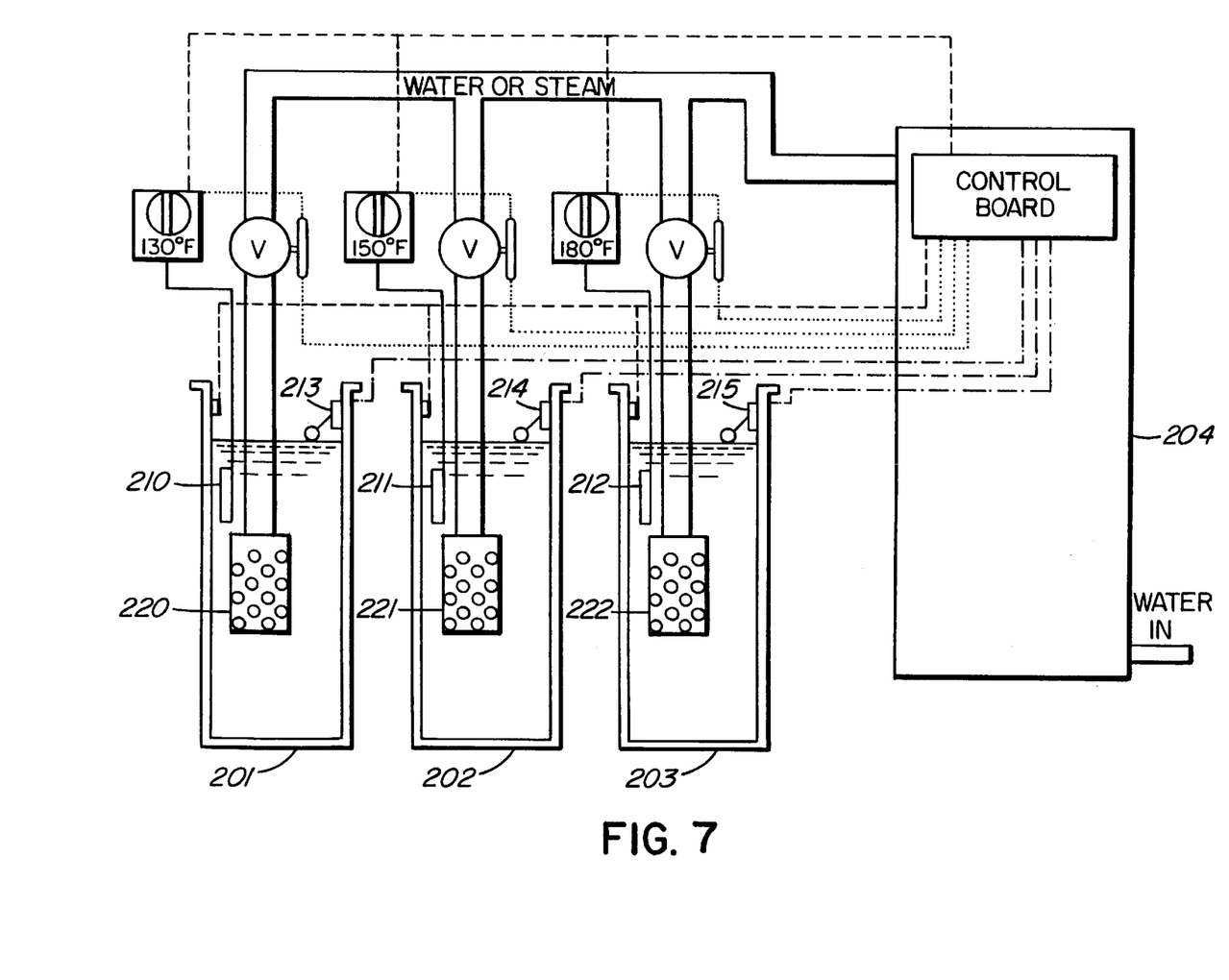
FIG. 7 diagrammatically illustrates a further embodiment of the invention used to control the temperature in a plurality of liquid holding containers.

A further embodiment of the invention is illustrated in FIG. 7. In this embodiment, three containers 201, 202, 203 are provided with the water in each of the containers 201, 202, 203 being maintained at different temperatures. The operation of the burner 204 is similar to the operation of the apparatus earlier described. However, each container 201, 202, 203 has its own temperature sensor 210, 211, 212, respectively. When water fills each of the containers 201, 203, 203 as sensed by level indicators 213, 214, 215, the burner 204 is converted to its steam generating mode as previously described. When the temperature sensors sense a temperature within a container that falls below the desired value, steam will be provided to the container from respective spargers 220, 221, 222 until the temperature sensors sense the correct operating temperature. If water falls below the desired level in a container as sensed by level sensors 213, 214, 215, the burner 204 is converted to its high flow mode as previously described to fill the respective container. High level sensors 230, 231, 232 are provided. If the water level is too high in a container, the solenoid valve for that container will close thereby preventing water overflow.

It may be the case that very cold conditions can exist where the burner system 101 is used with the sparger 106. In that case, it is possible for the steam to condense and create added water in the container which, eventually, may overflow. In such conditions, a heat exchanger could be used where the steam circulated within the container without contacting the water and was released to atmosphere outside the container. Alternatively, the steam could be regenerated into a tank and used as part of the water source for recycling purposes.

Many further modifications will readily occur to those skilled in the art to which the invention relates and the specific embodiments described and illustrated should be taken as illustrative of the invention only and not as limiting its scope as defined in accordance with the accompanying claims.

We claim:

1. Apparatus for heating water to a predetermined temperature, said apparatus comprising a burner, a water jacket surrounding said burner for heating said water to said predetermined temperature, a water source to supply water to said water jacket surrounding said burner, a water outlet from said water jacket and said burner for carrying said water following said heating of said water by said burner to said predetermined temperature, a pump to move said water from said water source to said water jacket, a water temperature sensor operably connected to said water jacket for sensing said predetermined temperature of said water and a first water volume control for regulating the volume of said water provided to said water jacket of said burner from said water source, said first water volume control being responsive to said water temperature sensor.

2. Apparatus as in claim 1 and further comprising a second water volume control for regulating the volume of said water provided to said water jacket from said water source, said second water volume control being responsive to said first water temperature sensor.

3. Apparatus as in claim 2 wherein said first water volume control provides a greater volume of water to said water jacket than said second water volume control.

4. Apparatus as in claim 3 wherein said first water volume control provides said greater volume of water to said water jacket when said water temperature sensor senses a temperature greater than said predetermined temperature.

5. Apparatus as in claim 4 wherein said second water volume control provides water to said water jacket when said water temperature sensor senses a temperature lower than said predetermined temperature.

6. Apparatus as in claim 5 wherein said first and second water volume controls provide a continuous supply of water to said water jacket when said water is flowing to said water jacket.

7. Apparatus as in claim 6 and further comprising a steam volume control for providing a volume of water to said water jacket which is less than said water volume provided by said first and second water volume controls.

8. Apparatus as in claim 7 wherein said pump is operably connected to said first water, said second water and said steam volume controls.

9. Apparatus as in claim 8 wherein said water jacket has a high water level sensor operably connected to said pump and said first water, said second water and said steam volume controls.

10. Apparatus as in claim 9 and further comprising a low water sensor operably connected to said pump and said first water, said second water and said steam volume controls.

11. Apparatus as in claim 10 and further comprising a steam water level control operably connected to said pump and said steam volume control, said steam water level control sensing deviations in water depth within said water jacket.

12. Apparatus as in claim 11 and further comprising a pressure sensor in said water outlet for sensing pressure, said pressure sensor being operably connected to said burner for terminating said burner when said pressure exceeds a predetermined value.

13. Apparatus as in claim 11 wherein said low water sensor is operably connected to said burner for terminating operation of said burner when said water level control in said water jacket falls below a predetermined value.

14. Apparatus as in claim 12 wherein said water temperature sensor is operably connected to said burner, said water temperature sensor terminating operation of said burner when said water temperature sensor senses a temperature above a predetermined value.

15. Apparatus as in claim 1 and further comprising a selector switch for selecting said predetermined temperature.

16. Apparatus as in claim 15 wherein said selector switch selects one of a plurality of predetermined temperatures.

17. Apparatus as in claim 16 wherein said selector switch further selects a steam state wherein said steam volume control provides a volume of water to said water jacket.

18. Apparatus as in claim 7 and further comprising a steam water line sensor operably connected to said water jacket, said steam water line sensor sensing a predetermined higher and lower level of water within said water jacket, said steam volume control and said pump providing said volume of water to said water jacket while said steam water line sensor senses a water level between said predetermined higher and lower level of water within said water jacket.

19. Method of heating water to a predetermined temperature comprising supplying water from a water source through a first water volume control to a water jacket surrounding a burner, heating said water in said water jacket to said predetermined temperature, sensing when said predetermined temperature is reached and regulating said first water volume control to control the volume of water flowing to said burner responsive to said temperature sensing.

20. Method as in claim 19 and further comprising supplying water from water source to said water jacket through a second water volume control, one of said first and second water volume controls providing water to said water jacket when said predetermined temperature is exceeded and the other of said first and second water volume controls providing water to said water jacket when said temperature of said water is lower than said predetermined temperature.

21. Apparatus for generating heated water comprising a source of water, a first circuit for conveying water to a burner, a first volume control for regulating the amount of said water conveyed to said burner through said first circuit, a second circuit for conveying water to said burner, a second volume control for regulating the amount of said water conveyed to said burner through said second circuit, an outlet from said burner for said water, and a temperature sensor for sensing the temperature of said water passing from said outlet.

22. Method of providing water at more than one predetermined temperature to a water jacket surrounding a burner, said method comprising the steps of selecting one of said predetermined temperatures for said water, passing water through said water jacket to heat said water to said predetermined temperature and regulating the volume of said water provided to said burner so as to maintain said water at said one of said predetermined temperatures.

23. Apparatus for generating steam for heating the temperature of a liquid to a predetermined value, said apparatus comprising a water source, a steam control circuit associated with said water source, a pump associated with said steam control circuit for supplying water to a water jacket of a burner and a steam water level sensor for sensing the level of water in said water jacket.

\* \* \* \* \*